United States Patent
Shen et al.

(10) Patent No.: US 6,486,900 B1
(45) Date of Patent: Nov. 26, 2002

(54) SYSTEM AND METHOD FOR A VIDEO DISPLAY SCREEN SAVER

(75) Inventors: Richard Chi-Te Shen, Leonia, NJ (US); Alan Peter Cavallerano, White Plains, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 239 days.

(21) Appl. No.: 09/605,490

(22) Filed: Jun. 28, 2000

(51) Int. Cl.[7] .................................................. G09G 5/00
(52) U.S. Cl. ....................... 345/867; 345/618; 345/628; 345/636; 345/638; 345/781; 348/173; 348/556; 348/558; 348/380
(58) Field of Search ................................ 345/618, 628, 345/636, 638, 781, 867; 348/173, 556–558, 380

(56) References Cited

U.S. PATENT DOCUMENTS

| | | | |
|---|---|---|---|
| 4,984,081 A | * 1/1991 | Miyoshi et al. | 358/180 |
| 5,170,256 A | * 12/1992 | Tabata | 358/230 |
| 5,231,491 A | * 7/1993 | Holoch | 358/141 |
| 5,291,295 A | * 3/1994 | Srivastava | 348/805 |
| 5,313,303 A | * 5/1994 | Ersoz et al. | 348/439 |
| 5,331,349 A | 7/1994 | Kim | 348/567 |
| 5,534,940 A | * 7/1996 | Sato et al. | 348/556 |
| 5,539,474 A | * 7/1996 | Tsunetomi et al. | 348/556 |
| 6,340,992 B1 | * 1/2002 | Markandey | 348/556 |
| 6,366,706 B1 | * 4/2002 | Weitbruch | 382/254 |

FOREIGN PATENT DOCUMENTS

| | | | |
|---|---|---|---|
| EP | 0326339 B1 | 8/1989 | H04N/5/44 |
| EP | 0393313 B1 | 10/1990 | H04N/5/44 |
| EP | 0498526 B1 | 8/1992 | H04N/5/45 |
| EP | 0708430 A2 | 4/1996 | G09G/1/16 |
| EP | 0895414 A2 | 2/1999 | H04N/5/445 |

OTHER PUBLICATIONS

Patent Abstracts of Japan, Watanabe Kohei, "Television Receiver," Publication No. 04322577, Nov. 12, 1992, Application No. 03090800, Apr. 22, 1991.

Patent Abstracts of Japan, Yoshiki Hiroshihei, "Television Receiver," Publication No. 02237283, Sep. 19, 1990, Application No. 01056421, Mar. 10, 1989.

* cited by examiner

*Primary Examiner*—Richard Hjerpe
*Assistant Examiner*—Jennifer T. Nguyen
(74) *Attorney, Agent, or Firm*—Edward W. Goodman

(57) ABSTRACT

A system for minimizing screen burn on a display screen caused by the display of video images that do not occupy the entire area of the display screen includes video image processing circuitry for formatting a received video signal to display an active image of the video signal on a portion of the display screen, and for displaying a screen saver on portions of the display screen that are not occupied by the formatted active image. A screen saver library provides a screen saver from a plurality of screen savers. Each screen saver in the plurality of screen savers occupies portions of the display screen that are not occupied by an active image.

18 Claims, 3 Drawing Sheets

SYSTEM AND METHOD FOR A VIDEO DISPLAY SCREEN SAVER

BACKGROUND OF THE INVENTION

1. Field of the Invention

The present invention is directed, in general, to video display screens and, more specifically, to a system and method for providing a screen saver for a video display screen.

2. Description of the Related Art

With the introduction of digital versatile disk (DVD) technology and the broadcast of digital television signals, video materials that have a wide horizontal-to-vertical aspect ratio are becoming more common. Conventional television monitors have a horizontal-to-vertical aspect ratio of four-to-three (4:3). In a conventional television screen, the horizontal width of the screen is four units and the vertical height of the screen is three units.

When video materials that have a wide horizontal-to-vertical aspect ratio are displayed on a conventional four-to-three (4:3) aspect ratio television screen, typically either (1) the ends of the image are cropped to fit the central portion of the image into the 4:3 screen, or (2) the entire image is reformatted to a letterbox format that places black areas above and below the vertically-centered video image.

With the advent of high definition television (HDTV) display monitors, sixteen-to-nine (16:9) aspect ratio (widescreen) display monitors are gaining popularity with consumers. In order to display a conventional 4:3 aspect ratio television broadcast or to play video home system (VHS) tapes on these new generation widescreen monitors without distortion, the video image is typically reformatted either in "pillar-box" format or is reformatted as a zoomed image. The pillar-box format horizontally centers a 4:3 aspect ratio video image on the screen and frames the video image with a vertically-aligned black rectangle to the left of the video image and a vertically-aligned black rectangle to the right of the video image. The pillar-box format allows the full 4:3 video image to be displayed without distortion.

However, both the letterbox format and the pillar-box format cause the screen to be unevenly used. That is, the video image will always be in the horizontal or vertical central portion of the screen and the black areas will always be at the edges of the screen. Continual use will eventually cause the central portion of the screen to receive a greater amount of screen burn-in than the black areas of the screen.

Screen burn-in is a phenomenon that is associated with cathode ray tubes (CRTs) of television display screens. Screen burn-in occurs when the phosphors on the internal surface of the CRT screen deteriorate over time due to the frequent presence of currents required for creating the television video image. The black areas that continually receive fewer television video images will not experience as much screen burn-in as the central area of the screen. Eventually, there will be a noticeable difference between the central area of the screen and the black edge areas of the screen due to the accumulation of more screen burn-in in the central area of the screen. Techniques to minimize screen burn-in difference, such as, moving the central video image very slowly up and down the screen during a performance or sequentially using colors other than black in the edge areas that frame the central image, have not been well received by consumers.

Consumers have also not accepted the distorted images that result when 4:3 aspect ratio video materials are forced to fit horizontally into the widescreen profile. Consumers have more readily accepted video images in which non-linear interpolation has been applied to reduce distortion in the center portion of the image. Although the process to reduce distortion with non-linear interpolation produces a more acceptable video image, the process is expensive.

The minimization of screen burn-in is even more crucial for cathode ray tube (CRT) based projection video displays because the CRT is driven harder in order to produce an adequate amount of light on the video image at the remotely located display screen. Additionally, in CRT projection video displays, there is no shadow mask to absorb energy as in the case of regular television set CRTs.

Screen burn-in differences in a display screen may also occur whenever the display screen displays a video image that does not occupy the entire area of the display screen. That is, the problem of screen burn-in differences is not limited to cases involving the display of a video image with an aspect ratio that differs from the aspect ratio of the display screen.

There is, therefore, a need in the art for an improved system and method for displaying video images in video display screens. In particular, there is a need for an improved system and method for displaying video images that do not occupy the entire area of the display screen. More particularly, there is a need for an improved system and method for displaying video images that have an aspect ratio that differs from the aspect ratio of the display screen on which they are to be displayed. Additionally, there is a need for an improved system and method for minimizing the relative level of screen burn-in in the central area of a television display screen caused by lack of comparable screen burn-in in the frequently blackened portions of the edge areas of the television display screen.

SUMMARY OF THE INVENTION

To address the above-discussed deficiencies of the prior art, it is a primary object of the present invention to provide, for use in a video display apparatus having a display screen, such as a television, an improved system and method for displaying video images having an aspect ratio that differs from the aspect ratio of the display screen on which the video images are to be displayed.

It is also an object of the present invention to provide an improved system and method for minimizing screen burn on a display screen caused by the display of video images having an aspect ratio that differs from the aspect ratio of the display screen.

It is another object of the present invention to provide an improved system and method for minimizing the amount of relative screen burn-in that occurs in the central area of a display screen due to the lack of comparable screen burn-in in the blackened portions of the edge areas of the display screen caused by the display of video images having an aspect ratio that differs from the aspect ratio of the display screen.

It is additional object of the present invention to provide an improved system and method for minimizing screen burn-in on a display screen caused by the display of a video image that does not occupy the entire area of the display screen.

It is another object of the present invention to provide an improved system and method for minimizing the amount of relative screen burn-in that occurs in the central area of a display screen due to the lack of comparable screen burn-in in the blackened portions of the edge areas of the display screen caused by the display of a video image that does not occupy the entire area of the display screen.

The system of the present invention comprises a detection circuit that is capable of determining the aspect ratio of an active image of a received video signal. The system also comprises a video formatter that is capable of comparing the aspect ratio of the active image with the aspect ratio of a display screen, and in response to said comparison, capable of formatting the active image for display on the display screen. The system also comprises a display buffer that is capable of transferring to the display screen (1) the formatted active image and (2) a screen saver that occupies portions of the display screen that are not occupied by the formatted active image. The system also comprises a screen saver library containing a plurality of screen savers with various types of display formats.

The method of the present invention comprises the steps of determining the aspect ratio of an active image of a video signal; comparing the aspect ratio of the active image with the aspect ratio of a display screen; formatting the active image in response to the comparison of aspect ratios; providing a screen saver to be displayed with the formatted active image to occupy areas of the display screen that are not occupied by the active image; and displaying the active image and the screen saver on the display screen.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DESCRIPTION OF THE PREFERRED EMBODIMENTS

Figure 1:
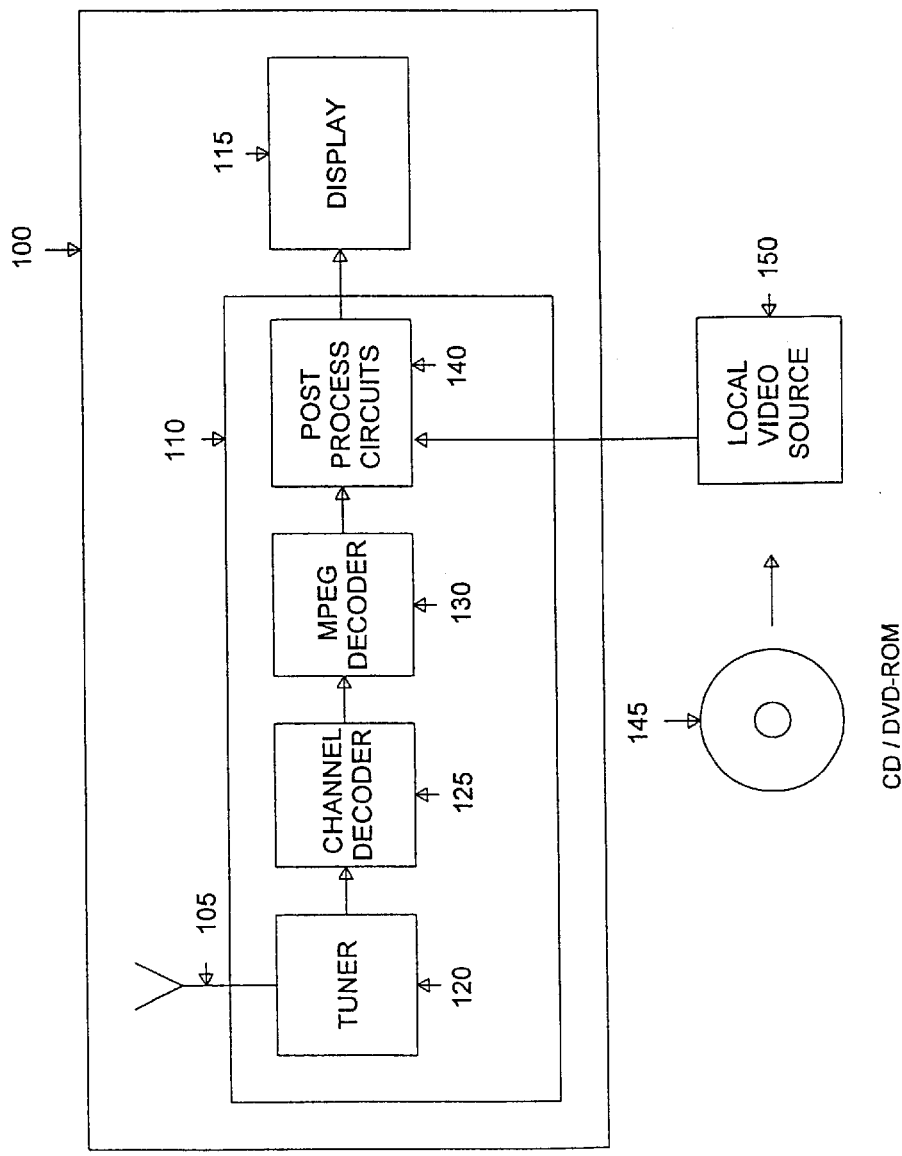
FIG. 1 illustrates a block diagram of a portion of an exemplary television set according to one advantageous embodiment of the present invention.
Figure 2:
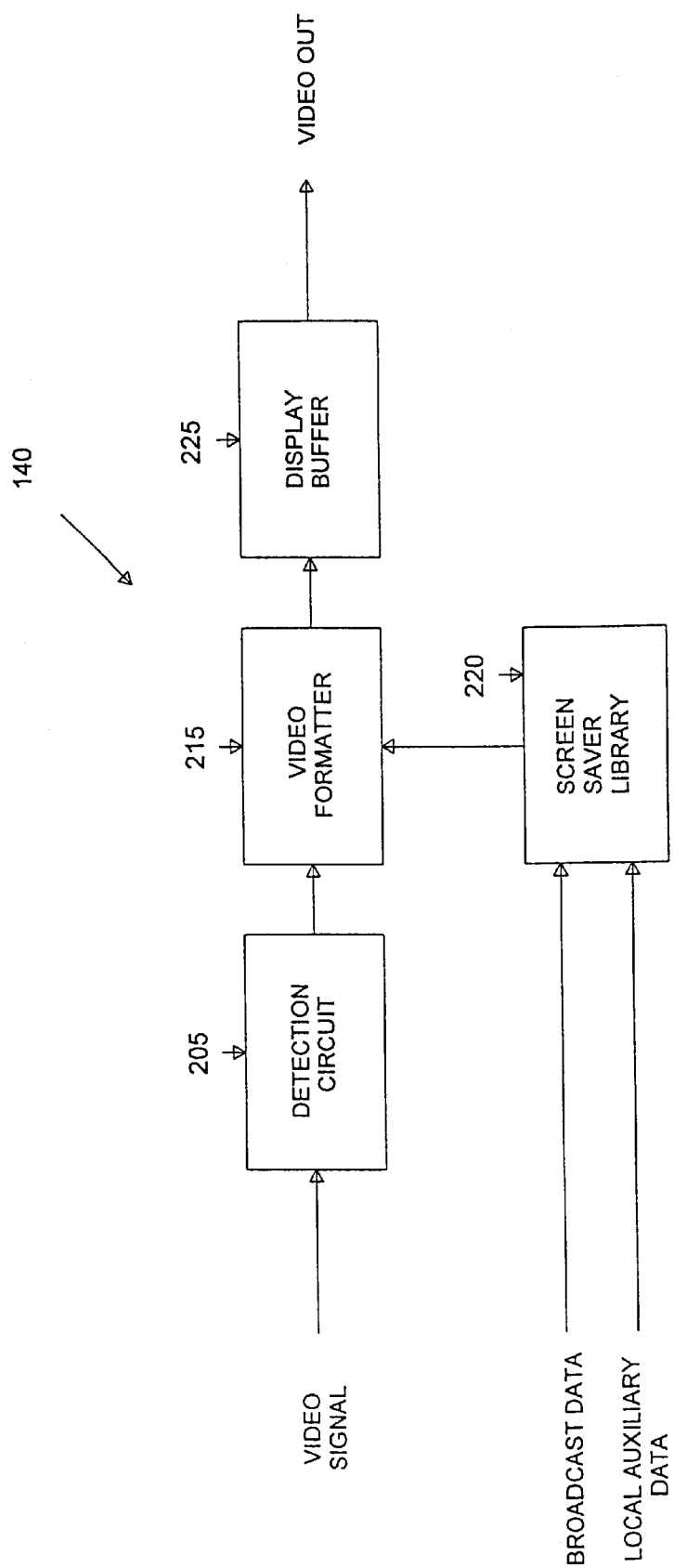
FIG. 2 illustrates a block diagram of exemplary video post processing circuitry according to one advantageous embodiment of the present invention.
Figure 3:
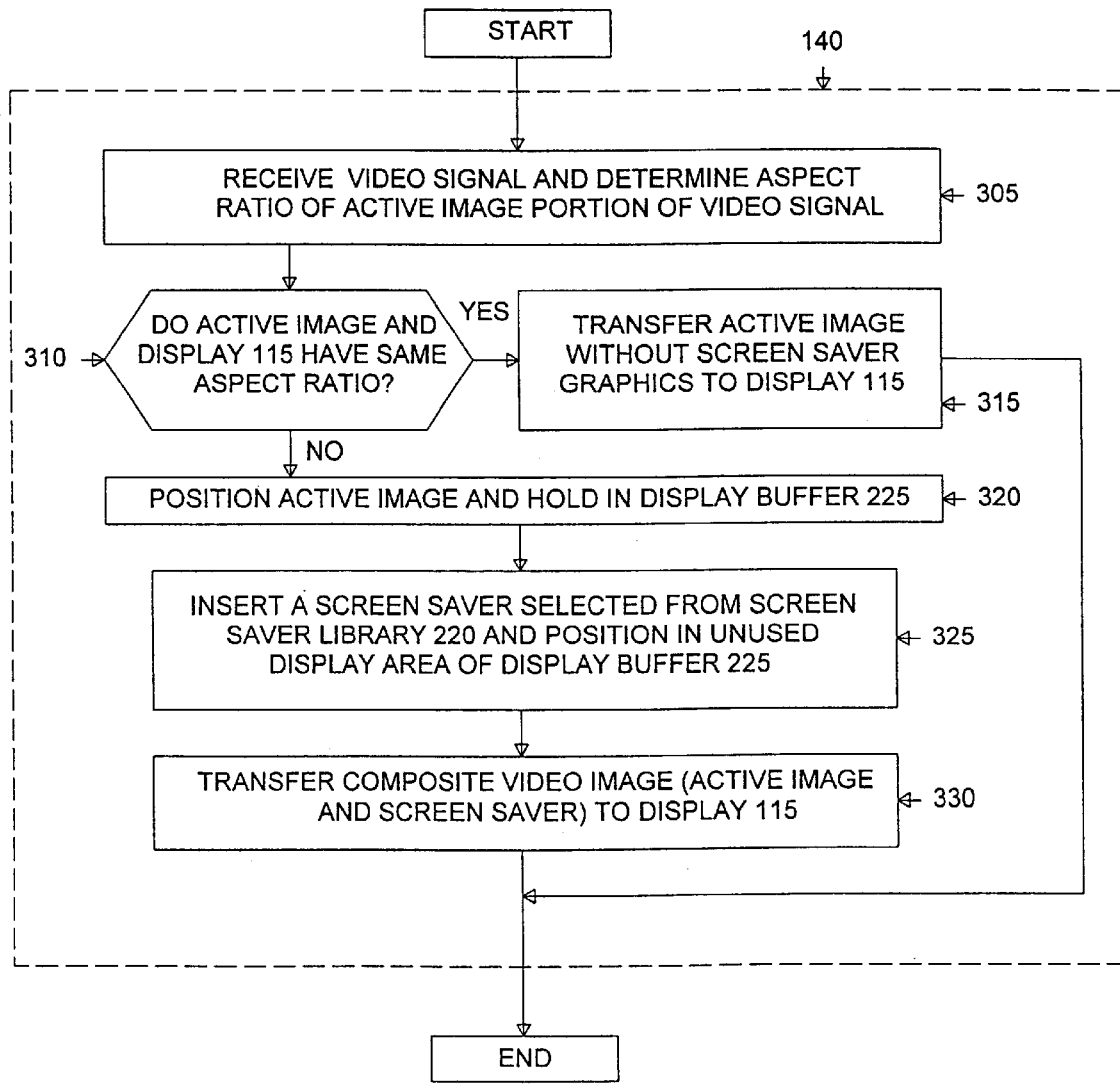
FIG. 3 illustrates a flowchart depicting the operation of exemplary video post processing circuitry according to one advantageous embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system that has a video display screen.

FIG. 1 illustrates a block diagram of a portion of exemplary television set 100 according to one advantageous embodiment of the present invention. The illustrated portion of exemplary television set 100 comprises antenna 105 coupled to a television receiver 110. A television monitor display (display) 115 is coupled to the television receiver 110. The illustrated portion of the television receiver 110 further comprises a tuner 120, a channel decoder 125, a Moving Pictures Experts Group (MPEG) decoder 130, and a post-processing circuitry 140.

The television receiver 110 is capable of receiving a locally generated video signal from a local video source 150. The local video source 150 may be a video cassette recorder (VCR), a compact disk/digital versatile disk (CD/DVD) player, a computer, or any other source of video images. In FIG. 1, a compact disk/digital video disk read-only-memory 145 (CD/DVD-ROM 145) represents the media that may be read in the local video source 150. The local video source 150 is coupled directly to the post-processing circuitry 140.

The tuner 120 deconverts a user-selected broadcast television signal to produce an intermediate frequency (IF) signal. The channel decoded 125 demodulates the IF signal to produce MPEG data streams that are input to the MPEG decoder 130. The MPEG decoder 130 decompresses the MPEG signals according to one of several MPEG standards to produce a baseband video signal. The post-processing circuitry 140 further processes the output from the MPEG decoder 130 to produce enhanced video images for transfer to the display 115.

The MPEG decoder 130 also transfers, to the post-processing circuitry 140, image format information and the aspect ratio of the active portion of the video image transferred by the MPEG decoder 130. The local video source 150 also transfers, to the post-processing circuitry 140, image format information and the aspect ratio of the active portion of the video image transferred by the local video source 150. If the post-processing circuitry 140 does not receive information concerning the image format and the aspect ratio, then the post-processing circuitry 140 determines the aspect ratio of the active portion of the received video image. The post-processing circuitry 140 formats the received video image for display. The post-processing circuitry 140 may either (1) make no changes to the received video image, or (2) adapt the received video image to either the full vertical height or full horizontal width available for display 115.

According to the principles of the present invention, the post-processing circuitry 140 selects, sizes, positions, and merges graphics for a particular screen saver with the received video image. The post-processing circuitry 140 may optionally select auxiliary data from the received broadcast signal or a locally available data source (shown in FIG. 2) for insertion with the screen saver for the display 115. The auxiliary data may include screen graphics, current time, current date, program guide, and similar types of information. The post-processing circuitry 140 is described in greater detail below.

In one advantageous embodiment, the display 115 comprises a cathode ray tube (CRT) video screen with a 4:3 aspect ratio, referred to as 4:3 display 115. According to another advantageous embodiment, the display 115 comprises a video screen with a widescreen 16:9 aspect ratio, referred to as 16:9 display 115. According to still another advantageous embodiment, the display 115 comprises a high definition television (HDTV) screen with a 16:9 aspect ratio, referred to as HDTV 16:9 display 115.

FIG. 2 illustrates an exemplary post-processing circuitry 140 in greater detail, according to one advantageous embodiment of the present invention. The post-processing circuitry 140 comprises a detection circuit 205, a video formatter 215, a screen saver library 220, and a display buffer 225. The detection circuit 205 receives image format information and the aspect ratio from MPEG decoder 130 (or local video source 150). If the detection circuit 205 does not receive information concerning the image format and the aspect ratio, then the detection circuit 205 analyzes the incoming baseband video signal according to well-known algorithms to determine the aspect ratio of the active portion of the received video image. For convenience, the active portion of the video image will be referred to herein as the active image. The detection circuit 205 transfers the baseband video signal with an indication of its aspect ratio to the video formatter 215.

When the video formatter 215 receives an active image (and its aspect ratio) from the detection circuit 205, the video formatter 215 compares the aspect ratio of the active image with the known aspect ratio of the display 115 and determines whether the aspect ratio of the active image is the same as the aspect ratio of the display 115. If the two aspect ratios are the same, it is not necessary to add a screen saver because the active image will cover the entire screen of the display 115. If the two aspect ratios are not the same, the video formatter 215 will add a screen saver outside the active image as described more fully below.

If the display 115 has an aspect ratio of 4:3 and the active image has an aspect ratio of 16:9, then the 16:9 active image will usually be displayed in a letterbox format. The letterbox format will have black areas above and below the central area of the screen that displays the active image.

If display 115 has an aspect ratio of 16:9 and the active image has an aspect ratio of 4:3, then the 4:3 active image will usually be displayed in a pillar-box format. The pillar-box format will have black areas to the left and to the right of the central area of the screen that displays the active image.

When the aspect ratio of the active image is not the same as the aspect ratio of the display 115, then the video formatter 215 determines the amount of unused display area available for a screen saver based on the differences between the aspect ratio of the display 115 and the aspect ratio of the active image. The video formatter 215 then aligns an appropriately-sized screen saver with the active image and transfers the composite video image to the display buffer for temporary storage.

The screen saver library 220 stores graphical images of one or more screen savers in a format that can be merged with active images. In another advantageous embodiment, the screen saver library 220 may optionally receive broadcast data with the incoming video signal. The broadcast data may comprise auxiliary text or graphical images, or both, collectively referred to as auxiliary data, for display with active images. The broadcast data, if present, may be extracted by the post-processing circuitry 140 from the vertical blanking interval of the original incoming video signal (similar to closed captioned text) or MPEG stream. The screen saver library 220 may optionally be directed to process the broadcast data and merge the resultant auxiliary data with the selected screen saver image. In another advantageous embodiment, the screen saver library 220 may also optionally receive and process local auxiliary data and incorporate the local auxiliary data as part of the screen saver display.

The display buffer 225 temporarily stores the composite video image from the video formatter 215. If the video formatter 215 has determined that the active image has the same aspect ratio as the display 115, then no screen saver is required. In that case, the display buffer 225 transfers the original active image as a Video Out signal to the display 115 with no other changes.

When the video formatter 215 determines that a screen saver is needed (i.e., that the active image does not have the same aspect ratio as display 115), then the video formatter 215 selects one of several possible active image location algorithms and positions the active image in the display buffer 225 according to the selected algorithm. The video formatter 215 also selects one of several possible screen saver graphics from the screen saver library 220 to be displayed in the identified unused screen areas. The screen saver thus equalizes the level of screen burn throughout the entire screen. This means that edge areas (that would otherwise be black without the screen saver) will not receive less screen burn-in than the central area of the screen. The use of a screen saver to ensure that all of the screen is used uniformly prevents screen burn-in from developing in portions of the screen.

In another advantageous embodiment, the post-processing circuitry 140 provides one or more screen savers for a 4:3 aspect ratio display 115. The detection circuit 205 applies an algorithm to the received video signal to determine the aspect ratio and the transmission format of the received active image. When the detection circuit 205 determines that the active image has a 16:9 aspect ratio and is formatted in a letterbox format for a 4:3 aspect ratio video display, the video formatter 215 extracts the active image and positions the active image in the display buffer 225 for display in a pre-determined location on the display 115. For example, the video formatter 215 may position the active image for the letterbox format in the center of the screen of the display 115.

In another advantageous embodiment, the video formatter 215 may position the active image in the display buffer 225 so that the active image appears flush with the top of the screen of the display 115 instead of appearing as a centered letterbox. In still another advantageous embodiment, the video formatter 215 may position the active image flush with the bottom of the screen of the display 115.

After storing the active image in storage locations in the display buffer 225 that are associated with the appropriate display position, the video formatter 215 transfers a selected screen saver from the screen saver library 220 to the display buffer 225 for placement in the unused display areas.

Because rapidly moving or changing video images and brightly colored objects are known to distract viewers, the screen saver library 220 provides one or more screen saver displays with optional auxiliary data that change slowly, infrequently, or not at all, and with colors that are subdued compared to the active image. These same conditions are maintained when optional auxiliary data (either broadcast or local) is merged into the screen saver video image.

In one advantageous embodiment, the screen saver library 220 may provide a screen saver that presents useful information in an unobtrusive video frame. The video frame may present one or more slowly moving images such as graphics that enhance the displayed active image. Alternatively, the video frame may present a non-black background with superimposed auxiliary information, such as, subtitles, program guides, graphics, or the status of other programs. In another embodiment, the screen saver library 220 may provide a screen saver that presents a subdued colored pattern that changes color very slowly in a manner designed to not distract the viewer.

In another advantageous embodiment, the screen saver library 220 may provide at least one screen saver that resembles a stage in a theater. This type of screen saver is referred to as a "stage screen saver". The stage screen saver can be used when the active image is, for example, a movie from the CD/DVD-ROM 145 or a televised musical performance. In another advantageous embodiment, the screen saver library 220 may modify the stage screen saver in accordance with an algorithm. For example, the screen saver library 220 may apply an algorithm that analyzes the content of the active image to determine an appropriate non-black color and brightness for the stage screen saver. In an alternative advantageous embodiment, the screen saver library 220 may format the stage screen saver to make one or more areas available for the optional auxiliary data that has been previously described.

In still another advantageous embodiment, the post-processing circuitry 140 may obtain auxiliary text from external providers and create useful user graphics or text graphics for transmission with the desired program content. This advantageous embodiment reduces the requirement for the television receiver to actually generate the screen saver graphics that appear on the display.

In another advantageous embodiment, the post-processing circuitry 140 is configured as part of a high-definition television (HDTV) receiver 100 and a 16:9 HDTV display 115. When the detection circuit 205 determines that a 4:3 aspect ratio active image has been received, the video formatter 215 places the active image in the appropriate storage location in the display buffer 225 so that the active image is centered horizontally on the 16:9 HDTV display 115. In this case, the 4:3 active image fully occupies the vertical height of the 16:9 HDTV display 115, with some horizontal space remaining unused on both sides of the active image.

In one advantageous embodiment, the screen saver library 220 may contain a screen saver that resembles the front side bezels of a television monitor or may contain a screen saver that resembles the sides of a beveled picture frame. The video formatter 215 positions the selected bezel screen saver or the selected picture frame screen saver for display on the unused left and right portions of the 16:9 HDTV display 115.

In another advantageous embodiment, the video formatter 215 may position a 4:3 aspect ratio active image so that it is offset from the center of the screen and flush with either the left side or the right side of the screen. Positioning the active image in this manner produces one unused display area on one side of the active image instead of two smaller unused display areas on each side of the centered active image. As in the case of the pillar-box format, the video formatter 215 may then cause optional content-related information associated with the television signal (e.g., broadcast data received by the screen saver library 220) to be transferred to a 16:9 display 115 for display in the unused display area of the screen. In another advantageous embodiment, the video formatter 215 may optionally insert local auxiliary data from the screen saver library 220 (such as, the date, time of day, program guide, etc.) into a screen saver for display in the one unused display area.

Unused display areas can be used by broadcasters or video content providers to display information related to the content of the programs. For example, when the active image is already formatted to letterbox format for display on 4:3 aspect ratio television sets, then subtitles, program status and other useful information can be inserted at the television studio. The same principle applies to 4:3 aspect ratio materials that are formatted for widescreen displays.

It is noted that the capability of the present invention to provide screen saver graphics differs from the well-known "picture-out-of-picture" (POP) capability of certain television receivers. POP television receivers simultaneously receive and display two video programs. A POP television receiver must receive two or more video signals simultaneously. Therefore, a POP television receiver must have two tuners. This makes a POP television receiver more expensive than a single tuner television receiver. In contrast, the present invention requires a television receiver that is equipped with only one tuner. Although the screen saver of the present invention may be incorporated into a POP television receiver, the screen saver of the present invention does not require the POP capability.

A video content provider can also use the present invention to pre-format a main video program to an appropriate aspect ratio and provide appropriate supplemental contents in the format. Pre-formatting the video program eliminates the need for the television receivers that receive the signals to perform any processing. The television receivers need only display the pre-formatted video programs as they are received.

Screen burn-in differences in a display screen may occur whenever the display screen displays a video image that does not occupy the entire area of the display screen. That is, the problem of screen burn-in differences is not limited to cases involving the display of a video image with an aspect ratio that differs from the aspect ratio of the display screen.

For example, a high definition television (HDTV) display monitor with a sixteen-to-nine (16:9) aspect ratio is typically deployed with a fixed scan format (such as 1920×1080 pixels or 854×480 pixels) to reduce costs. If a video image that has an image format of 800×600 pixels is to be displayed on such a 16:9 display monitor, the active image region before any re-formatting is only 800×600 pixels out of 1920×1080 pixels. Another example is a video source that has a two point one to one (2.1:1) aspect ratio. Other examples include VGX, SVG, and XGA display formats.

In these cases, instead of directly comparing the aspect ratio of the active signal with the aspect ratio of the display 115, the post-processing circuitry 140 compares the image format information of the active video image with the image format information of the display 115. As described more fully below, an appropriate screen saver is selected to cover those portions of the display 115 that are not covered by the active signal.

FIG. 3 illustrates a flowchart 300 that depicts the operation of exemplary post processing circuitry 140 according to one advantageous embodiment of the present invention. In the course of normal operations, the detection circuit 205 receives the baseband video signal (and image format information and the aspect ratio) directly from the MPEG decoder 130 or the local video source 150. If the image format information and the aspect ratio is not received, then the detection circuit 205 determines the aspect ratio of the active image portion of the baseband video signal from the MPEG decoder 130 or the local video source 150 (process step 305).

The video formatter 215 then compares the aspect ratio of the active image with the aspect ratio of the display 115 (process step 310). If the video formatter 215 determines that the aspect ratio of the active image matches the aspect ratio of the display 115, then the video formatter 215 transfers the active image to the display buffer 225 and to the display 115 without modification (i.e., without the addition of a screen saver)(process step 315). For example, if the video formatter 215 determines that the active image and the display 115 both have an aspect ratio of 16:9, the video formatter 215 stores the active image in the display buffer 225 with a 16:9 aspect ratio and makes no changes or additions.

If the video formatter 215 determines that the active image does not have the same aspect as the display 115, then the video formatter 215 modifies the active image so that it is formatted to be appropriately centered on the screen of the display 115. The display buffer 225 stores the formatted active image in registers associated with an appropriately centered video display (process step 320).

For example, if the active image has an aspect ratio of 4:3 and the aspect ratio of the display 115 is 16:9, then the video formatter 215 adjusts the active image so that it is vertically and horizontally centered on the screen of the 16:9 display 115. The display buffer 225 then stores the formatted active image in the registers associated with a vertically and horizontally centered video display.

The video formatter 215 also determines the amount of vertical and horizontal unused display space surrounding the active image and uses this information to select a screen saver from the screen saver library 220. The video formatter 215 selects an appropriate screen saver from the screen saver library 220 and, if necessary, quantifies and partitions the graphics of the screen saver for placement in unused display space around the centered active image. The display buffer 225 stores partitions of the modified screen saver in storage registers associated with the unused vertical and horizontal spaces surrounding the centered active image, as appropriate (process step 325).

The display buffer 225 transfers the centered active image with the selected and partitioned screen saver to the display 115. The resultant composite video image comprises a centered active image that represents the televised image surrounded by appropriate screen saver graphics that do not detract from the visual reception of the active image (process step 330).

In cases where the fact that the video image does not occupy the entire area of the display screen is not due to differing aspect ratios of the video image and the display screen, the following alternate method is used. The detection circuit 205 is supplied with (or determines) image format information for the active image portion of the video signal (step 305). The video formatter 215 compares the image format information of the active image with the image format information of the display 115 (process step 310).

If the video formatter 215 determines that the image format information of the active image matches the image format information of the display 115, then the video formatter 215 transfers the active image to the display buffer 225 and to the display 115 without modification (i.e., without the addition of a screen saver)(process step 315).

If the video formatter 215 determines that the image format information does not match the image format information of the display 115, then the video formatter 215 modifies the active image so that it is formatted to be appropriately centered on the screen of the display 115. The display buffer 225 stores the formatted active image in the registers associated with an appropriately centered video display (process step 320). The remainder of the alternate method is the same as the method shown in FIG. 3 for providing a screen saver in those cases where the aspect ratio of the active signal differs from the aspect ratio of the display 115.

Although the present invention has been described with reference to cathode ray tube (CRT) television screens, it is clear that the present invention is not limited to use in CRT television screens. Any type of display screen may be used. Some types of display screens with which the present invention may be used include projection television display screens, flat panel television screens, liquid crystal display screens, light emitting diode screens, organic chemical display screens, and mirror display screens.

Although the present invention has been described in detail, those skilled in the art should understand that they can make various changes, substitutions and alterations herein without departing from the spirit and scope of the invention in its broadest form.

What is claimed is:

1. A system for minimizing screen burn in a display screen in a video display apparatus when said display screen displays a video image that does not occupy the entire area of the display screen, said system comprising:

video image processing circuitry for formatting a received video signal to display an active image of said video signal on a portion of said display screen, and for displaying a screen saver on portions of said display screen that are not occupied by said formatted active image, wherein said video image processing circuitry comprises a screen saver library for providing a screen saver from a plurality of screen savers, each screen saver in said plurality of screen savers occupying portions of said display screen not occupied by an active image, wherein said video image processing circuitry comprises:
a detection circuit for receiving a video signal and an aspect ratio of an active image of said video signal;
a video formatter coupled to said detection circuit, said video formatter comparing the aspect ratio of said active image with the aspect ratio of said display screen, and, in response to said comparison, formatting said active image to position said active image for display on said display screen; and
a display buffer coupled to said video formatter for transferring to said display screen said formatted active image and a screen saver occupying portions of said display screen not occupied by said formatted active image.

2. The system as claimed in claim 1 wherein said detection circuit determines the aspect ratio of an active image of said video signal.

3. The system as claimed in claim 1, wherein said screen saver library comprises:
means for receiving broadcast data with an incoming video signal; and
means for incorporating said broadcast data into said plurality of screen savers in said screen saver library.

4. The system as claimed in claim 1, wherein said screen saver library comprises:
means for receiving local auxiliary data; and
means for incorporating said local auxiliary data into said plurality of screen savers in said screen saver library.

5. The system as claimed in claim 1, wherein said display screen is a cathode ray tube television screen.

6. The system as claimed in claim 1, wherein said display screen is one of:
a projection television display screen, a flat panel television screen, a liquid crystal display screen, a light emitting diode screen, an organic chemical display screen, and a mirror display screen.

7. A system for minimizing screen burn in a display screen in a video display apparatus when said display screen displays a video image that does not occupy the entire area of the display screen, said system comprising:
video image processing circuitry for formatting a received video signal to display an active image of said video signal on a portion of said display screen, and for displaying a screen saver on portions of said display screen that are not occupied by said formatted active image,
wherein said video image processing circuitry comprises a screen saver library for providing a screen saver from a plurality of screen savers, each screen saver in said plurality of screen savers occupying portions of said display screen not occupied by an active image,
wherein said video image processing circuitry comprises:
a detection circuit for receiving a video signal and image format information of an active image of said video signal;
a video formatter coupled to said detection circuit for comparing the image format of said active image with the image format of said display screen, and, in response to said comparison, for formatting said active image to position said active image for display on said display screen; and
a display buffer coupled to said video formatter for transferring to said display screen said formatted active image and a screen saver that occupies portions of said display screen not occupied by said formatted active image.

8. The system as claimed in claim 7, wherein said detection circuit determines the image format of an active image of said video signal.

9. The system as claimed in claim 7, wherein said screen saver library comprises:
means for receiving broadcast data with an incoming video signal; and
means for incorporating said broadcast data into said plurality of screen savers in said screen saver library.

10. The system as claimed in claim 7, wherein said screen saver library comprises:
means for receiving local auxiliary data; and
means for incorporating said local auxiliary data into said plurality of screen savers in said screen saver library.

11. The system as claimed in claim 7, wherein said display screen is a cathode ray tube television screen.

12. The system as claimed in claim 7, wherein said display screen is one of:
a projection television display screen, a flat panel television screen, a liquid crystal display screen, a light emitting diode screen, a organic chemical display screen, and a mirror display screen.

13. A method of displaying a screen saver on a display screen in a video display apparatus to minimize screen burn in said display screen when said display screen displays an active image of a video signal that has an aspect ratio that differs from an aspect ratio of said display screen, the method comprising the steps of:
determining the aspect ratio of said active image of said video signal;
comparing the aspect ratio of said active image with the aspect ratio of said display screen;
formatting said active image in response to said comparison of aspect ratios;
selecting a screen saver from a screen saver library containing a plurality of screen savers, each screen saver in said plurality of screen savers occupying portions of said display screen not occupied by said active image; and
displaying said active image and said screen saver on said display screen.

14. The method as claimed in claim 13, wherein said display screen is a cathode ray tube television screen.

15. The method as claimed in claim 13, wherein said display screen is one of:
a projection television display screen, a flat panel television screen, a liquid crystal display screen, a light emitting diode screen, an organic chemical display screen, and a mirror display screen.

16. A method of displaying a screen saver on a display screen in a video display apparatus to minimize screen burn in said display screen when said display screen displays an active image of a video signal that has an image format that differs from an image format of said display screen, the method comprising the steps of:
determining the image format of said active image of said video signal;
comparing the image format of said active image with the image format of said display screen;
formatting said active image in response to said comparison of image formats;
selecting a screen saver from a screen saver library containing a plurality of screen savers, each screen saver in said plurality of screen savers occupying portions of said display screen not occupied by said active image; and
displaying said active image and said screen saver on said display screen.

17. The method as claimed in claim 16, wherein said display screen is a cathode ray tube television screen.

18. The method as claimed in claim 16, wherein said display screen is one of:
a projection television display screen, a flat panel television screen, a liquid crystal display screen, a light emitting diode screen, an organic chemical display screen, and a mirror display screen.

* * * * *